US008578510B2

(12) United States Patent
Cook et al.

(10) Patent No.: US 8,578,510 B2
(45) Date of Patent: Nov. 5, 2013

(54) ANTI-PIRACY MEASURES FOR A VIDEO GAME USING HIDDEN SECRETS

(75) Inventors: John Cook, Seattle, WA (US); Martin Otten, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 1146 days.

(21) Appl. No.: 12/147,459

(22) Filed: Jun. 26, 2008

(65) Prior Publication Data

US 2009/0328227 A1    Dec. 31, 2009

(51) Int. Cl.
G06F 7/04       (2006.01)
G06F 17/30      (2006.01)
H04N 7/16       (2011.01)

(52) U.S. Cl.
USPC ................................. 726/33; 726/26; 726/27

(58) Field of Classification Search
USPC .......................................................... 726/26
See application file for complete search history.

(56) References Cited

U.S. PATENT DOCUMENTS

| | | | | |
|---|---|---|---|---|
| 5,222,134 A * | 6/1993 | Waite et al. ...................... | 705/59 |
| 6,526,456 B1 * | 2/2003 | Allan et al. .................... | 719/328 |
| 6,986,041 B2 * | 1/2006 | Gilfix et al. .................... | 713/161 |
| 7,287,166 B1 * | 10/2007 | Chang et al. ................... | 713/187 |
| 2002/0087883 A1 | 7/2002 | Wohlgemuth et al. | |
| 2002/0091644 A1 | 7/2002 | Wong et al. | |
| 2002/0116627 A1 * | 8/2002 | Tarbotton et al. ............. | 713/200 |
| 2002/0144153 A1 * | 10/2002 | LeVine et al. ................ | 713/201 |
| 2003/0191942 A1 * | 10/2003 | Sinha et al. ................... | 713/181 |
| 2003/0233547 A1 * | 12/2003 | Gaston et al. ................. | 713/168 |
| 2003/0236986 A1 | 12/2003 | Cronce et al. | |
| 2004/0061676 A1 | 4/2004 | Sitrick et al. | |
| 2004/0062393 A1 | 4/2004 | Sitrick et al. | |
| 2004/0078585 A1 | 4/2004 | Cronce et al. | |
| 2005/0246537 A1 * | 11/2005 | Gunyakti et al. ............. | 713/176 |
| 2006/0090209 A1 * | 4/2006 | Garay et al. .................... | 726/26 |
| 2006/0271921 A1 | 11/2006 | Cronce et al. | |
| 2007/0061890 A1 | 3/2007 | Sitrick et al. | |
| 2007/0067643 A1 * | 3/2007 | Zhuk et al. .................... | 713/187 |
| 2007/0208664 A1 | 9/2007 | Ortega | |
| 2007/0250781 A1 | 10/2007 | Dolph | |
| 2007/0266436 A1 * | 11/2007 | Ballard et al. .................. | 726/24 |

OTHER PUBLICATIONS

"Anti-Piracy Security Mechanisms in PC Games," UW Computer Security Research and Course Blog, Jan. 11, 2008, 6 pages, http://cubist.cs.washington.edu/Security/2008/01/11/anti-piracy-secur . . . (accessed Sep. 4, 2008).

* cited by examiner

*Primary Examiner* — Saleh Najjar
*Assistant Examiner* — Michael Chao
(74) *Attorney, Agent, or Firm* — Frommer Lawrence & Haug LLP; John W. Branch (57) ABSTRACT

Embodiments are directed towards employing hidden secrets on a client device to detect and deter piracy of a computer application. The computer application is partitioned into components, where a subset of the components is initially provided to the client device. In one embodiment, the computer application is unable to execute properly within the removed or other set of components. The removed components not provided to the client device may then be modified based on hidden secrets information and a verification component and provided over a network to the client device. If the verification component is unable to locate an armed secret, or detects that an armed secret is modified, the computer application may be inhibited from installation and/or execution. In one embodiment, a secret might be unarmed, such that its presence, absence, and/or modification might be ignored.

20 Claims, 5 Drawing Sheets

ANTI-PIRACY MEASURES FOR A VIDEO GAME USING HIDDEN SECRETS

FIELD OF THE INVENTION

The present invention relates generally to detecting piracy of a computer application and more particularly, but not exclusively, detecting piracy of a computer application, such as a video game, using hidden secrets stored on a client device.

BACKGROUND OF THE INVENTION

Today, the computer gaming industry is a multi-billion dollar industry. Many computer application providers, such as computer game providers, and the like, have recognized the potential cost savings associated with distributing computer application over the Internet. However, while the Internet provides new opportunity for profits to computer application providers, it also creates a tremendous risk for piracy of the computer application. Such risk for piracy may arise at any place that the computer application is exposed. Without appropriate protection, the computer application can be illicitly intercepted, stolen, copied, and redistributed, thus depriving computer application providers of their profits. Therefore, there is a desire in the industry to minimize improper access to and/or use of computer applications. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "digital rights management" or "DRM" refers to any of a variety of access control technologies used to limit usage of digital media or devices.

As used herein, the term "secret" refers to information that is storable on a client device that contains information useable to compare with other information to detect a match and thereby detect a piracy of a related computer application. In one embodiment, the information within the secret is a random number that may be subsequently compared to another number to determine if there is a match. In another embodiment, the secret might be a word, text string, character, or the like, that may also be compared to another word, text string, character, or the like to determine if there is a match. For example, in one embodiment, the secret might include information that might be commonly identified with the computer application, such as a character name in a game, or other common item, theme, or the like, in the computer application. In one embodiment, the secret may be encrypted; however, the secret may also be un-encrypted.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards employing hidden secrets on a client device to detect and deter piracy of a computer application. In one embodiment, the computer application is a video game application. However, the invention is not so limited, and the computer application might be virtually any computer program, script, applet, or the like, that may be partitioned in components, such that a subset of the components may be initially provided to a client device. In one embodiment, the computer application is unable to execute properly within the removed or other set of components. That is in one embodiment, the computer application is unable to fully execute, such that a user might be unable to employ the application to fully perform the advertised and/or known functional aspects of the computer application. The removed components not provided to the client device may then be modified based on hidden secrets information and provided over a network to the client device.

In one embodiment, the subset of components may be initially provided to the client device over the network. In addition, a secrets manager component may also be provided to the client device. The secrets manager component may operate on the client device as a digital rights management component to generate and hide secrets on the client device. In one embodiment, at least one of the secrets may be hidden on the client device in "open view," such that a file manager search or the like, might readily locate the secret. However, the secret may be disguised as a standard text file, document, or the like, so as to be able to hide—in open view. However, other secrets may be hidden using a variety of other mechanisms. Moreover, in one embodiment, the secrets may include a randomly generated value. However, other secrets might include a generic character string, a code snippet, or the like. The secrets manager may generate and 'hide' a plurality of secrets on the client device, to reduce the likelihood that the secrets are destroyed or otherwise modified, improperly detected, or the like.

In any event, the secrets manager may generate a file describing the generated secrets and where they are hidden. The generated file, however, is configured and managed in memory, maintained so that it is not relocated and/or re-locatable to any form of persistent data store, such as a hard disk, or the like. The information block may then be encrypted using any of a variety of encryption mechanisms, and sent over the network. The removed components to the computer application may then be modified to include the secrets' information along with secret verification code useable to search and examine the hidden secrets. The modified components may then be provided over the network to the client device, where they may then be combined with the other components. When an attempt is made to install and/or execute the computer application, the secret verification code within the computer application is executed to search for the secrets. If an armed secret is unfound, or is otherwise determined to have been modified, then the computer application may be inhibited from installing and/or executing. In which instance, the user of the client device might be required to authenticate themselves, and/or validate their rights to employ the computer application. In one embodiment, at least one hidden secret might be designated as unarmed, indicating that its presence, absence, or modification thereof, might be ignored and not used to inhibit use of the computer application.

Illustrative Operating Environment

Figure 1:
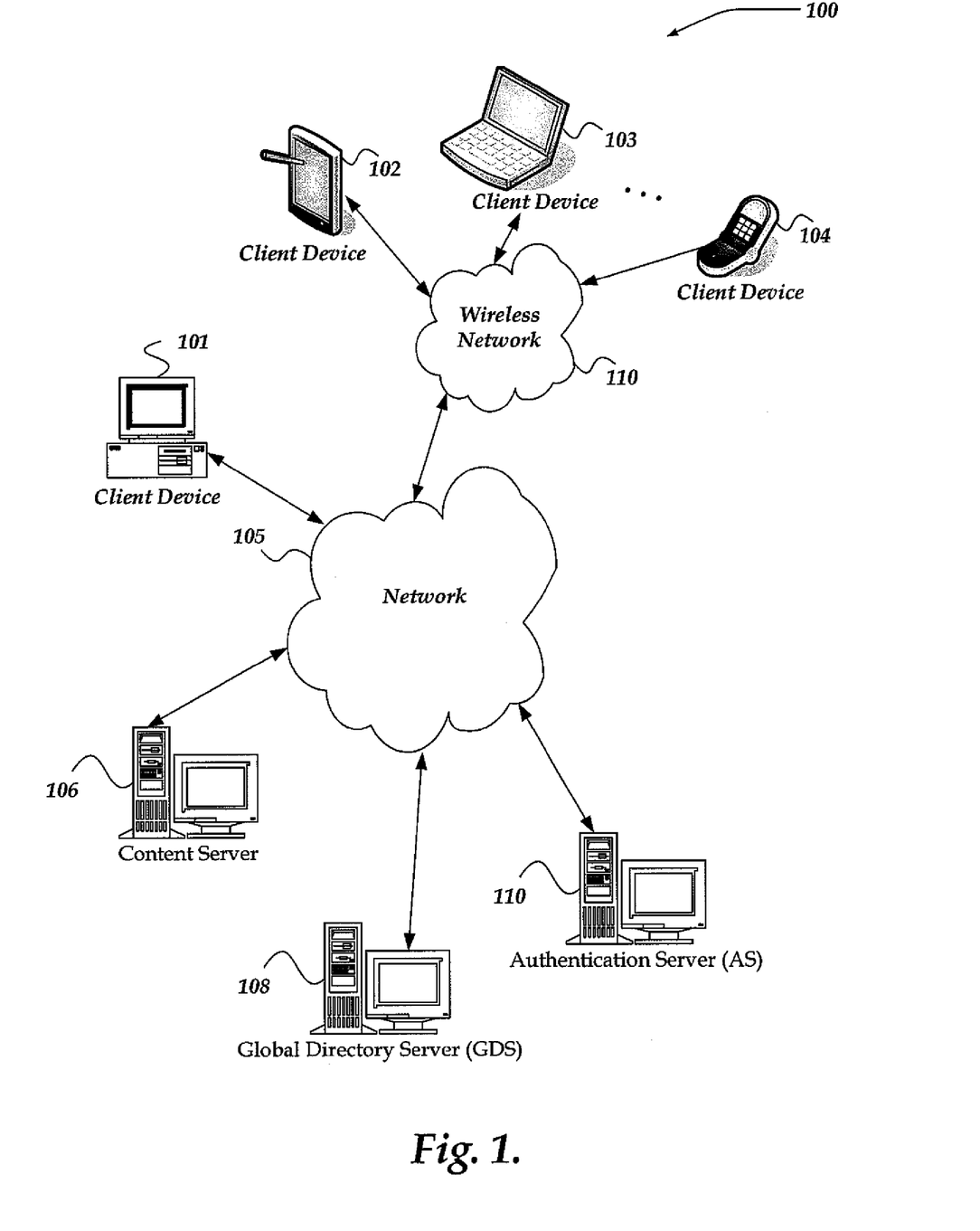
FIG. 1 shows a functional block diagram illustrating one embodiment of an environment for practicing the invention.

FIG. 1 illustrates a block diagram generally showing an overview of one embodiment of a system in which the present invention may be practiced. System 100 may include many more components than those shown in FIG. 1. However, the components shown are sufficient to disclose an illustrative embodiment for practicing the present invention. As shown in the figure, system 100 includes client devices 101-104, content server 106, Authentication Server (AS) 110, Global Directory Server (GDS) 108, and network 105.

One embodiment of a client device usable as one of client devices 101-104 is described in more detail below in conjunction with FIG. 2. Briefly, however, client devices 102-104 may include virtually any mobile computing device capable of receiving and sending a message over a network, such as network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLSeript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, components to a computer application, such as a video game, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to enable a user to request and/or otherwise obtain various computer applications, including, but not limited to video games. In one embodiment, the computer application may be obtained via a portable storage device such as a CD-ROM, a digital versatile disk (DVD), optical storage device, magnetic cassette, magnetic tape, magnetic disk storage, or the like. However, in another embodiment, client devices 101-104 may be enabled to request and/or otherwise obtain various computer applications over a network, such as from content server 106, or the like. It should be noted that while, some embodiments are directed towards computer applications, the invention is not so limited. Thus, in another embodiment, the request and access may be made to any of a variety of digital executable content, including, but not limited to motion pictures, movies, videos, music, interactive media, audios, or the like, that may be decomposed into components, such that a subset of the components may be initially provided to the client device, and another subset of the components provided at a later time period. Moreover, in one embodiment, the initial subset of components is configured to be unable to install and/or execute properly or fully, without the other subset of components of the digital content. For example, in one embodiment, the initial subset might enable access to a main menu, but the main menu is at least partially inoperative.

In one embodiment, a user requesting a computer application, or other digital content, may be asked to register with an application provider to enable access and/or execution of the application. Registration may be performed using any of a variety of mechanisms. For example, an end-user of client devices 101-104 may employ an activation key, a user name/password, private account credentials, or the like, to register and/or authenticated for installation and/or execution of the computer content. In one embodiment, client devices 101-104 may be authenticated through AS 110, and registered to execute the digital content through GDS 108, content server 106, or the like. In one embodiment, the authentication might be useable to enable the user to receive digital rights sufficient to access and/or otherwise obtain at least a subset of the computer application, or other digital content.

In one embodiment, as described in more detail below, upon being initially authenticated, a user of one of client devices 101-104 may be enabled to access at least a portion of a requested computer application. In one embodiment, the access may be performed over network 105, where a portion of the computer application might be downloaded on the client device. Moreover, a secrets manager may also be delivered onto the client device, where the secrets manager is configured and arranged to generate and store a plurality of hidden secrets on the client device. The secrets manager may then securely provide information about the stored secrets to content server 106, or the like, including information about what is in the secret, where it is stored on the client device, how it is stored, or the like. The requesting client device may then receive the remaining portions from the over network 105. When the user attempts to install and/or execute the computer application requested, a component within the computer application performs a secrets verification check on the stored secrets. If armed secrets are not found and/or determined to be invalid, the computer application may be selectively inhibited from installing and/or executing.

Network 105 is configured to couple one computing device and its components with other computing devices. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 104 with various degrees of mobility. For example, network 105 may enable a radio connection through a radio network access such as Global System for Mobil communication (OSM), General Packet Radio Services (GPRS), Enhanced Data GSM Environment (EDGE), Wideband Code Division Multiple Access (WCDMA), and the like. In essence, network 105 may include virtually any wireless and/or wired communication mechanism by which information may travel between computing devices, another network, and the like.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

GDS 108 is configured to provide location information about AS 110, content server 106, and the like, to client devices 101-104, and/or to content server 106. ODS 108 may also receive location information from AS 110, content server 106, and the like. In one embodiment, the location information includes an IP address. Location information may also include a Universal Resource Locator (URL), Media Access Control (MAC) address, and the like. In one embodiment, client devices 101-104 may communicate with GDS 108 to obtain location information for AS 110, content server 106, or the like.

AS 110 is configured to authenticate an end-user, such as an end-user of client devices 101-104, and to provide the authenticated user one or more content tickets that enables the authenticated user to access one or more content servers (106). In one embodiment, AS 110 might provide authentication information to content server 106, directly, and/or indirectly through the user, client device, or the like, that is useable to access the computer application residing within content server 106.

In one embodiment, AS 110 might operate in conjunction with content server 106 and/or a secrets verification code on a client device to manage actions based on a detection of possible piracy. For example, AS 110 might select to send a message or the like to a user indicating that such piracy has been detected; invalidate a user's account, or the like.

Content server 106 may include any computing device capable of connecting to network 105 to manage delivery of components of an application, such as a game application, or virtually any other digital content. In addition, content server 106 may also be configured to enable an end-user, such as an end-user of client devices 101-104, to selectively access, install, and/or execute the application based on verification of hidden secrets. In one embodiment, content server 106 might be configured to provide to a requesting client device a portion of the requested computer application, such that the provided portion is unable to properly install and/or execute on the client device without the remaining portion of the computer application. Content server 106 may receive secrets information from the client device and use such information to build the remaining portions of the computer application. Content server 106 may then provide the remaining portions of the computer application to the client device.

Devices that may operate as AS 110, content server 106, and/or GDS 108 include personal computers, desktop computers, multiprocessor systems, microprocessor-based or programmable consumer electronics, network PCs, servers, and the like.

Moreover, although AS 110, content server 106, and GDS 108 are described as distinct servers, the invention is not so limited. For example, one or more of the functions associated with these servers may be implemented in a single server, distributed across a peer-to-peer system structure, or the like, without departing from the scope or spirit of the invention.

Illustrative Client Device

Figure 2:
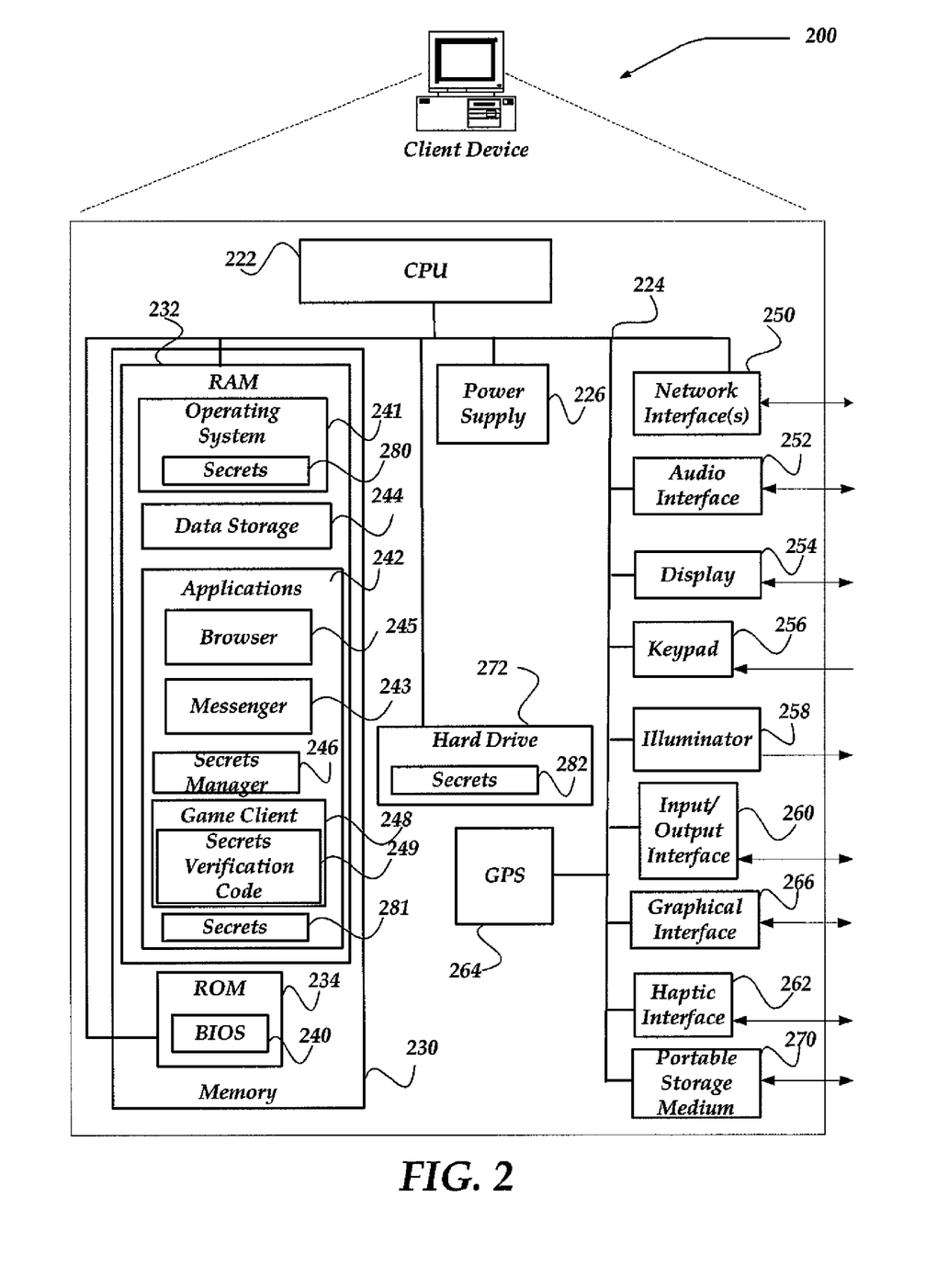
FIG. 2 shows one embodiment of a client device for use in the environment of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252 that may be configured to receive an audio input as well as to provide an audio output, a display 254, a keypad 256, an illuminator 258, an input/output interface 260, a haptic interface 262, and a global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery. Client device 200 may also include a graphical interface 266 that may be configured to receive a graphical input, such as through a camera, scanner, or the like.

Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to Her determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may, through other components, provide other information that may be employed to determine a geo physical location of the device, including for example, a MAC address, IP address, or other network address.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications and/or other data. For example, data storage 244 may also be employed to store information that describes various capabilities of client device 200, a device identifier, and the like. The information may then be provided to another device based on any of a variety of events, including being sent as part of a header during a communication, sent upon request, or the like.

In one embodiment, data storage 244 may also include cookies, portions of a computer application, user preferences, and/or other digital content, and the like. At least a portion of the stored data may also be stored on an optional hard disk drive 272, optional portable storage medium 270, or other storage medium (not shown) within client device 200.

Applications 242 may include computer executable instructions which, when executed by client device 200, transmit, receive, and/or otherwise process messages (e.g., SMS, MMS, IMS. IM, email, and/or other messages), audio, video, and enable telecommunication with another user of another client device. Other examples of application programs include calendars, browsers, email clients, IM applications, VOIP applications, contact managers, task managers, database programs, word processing programs, security applications, spreadsheet programs, search programs, and so forth. Applications 242 may further include browser 245, messenger 243, game client 248, and secrets manager 246. In one embodiment, game client 248 may include secrets verification code 249, as described further below.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed.

Game client 248 represents a game application; however, game client 248 is not limited to game applications, and may also represent virtually any computer application, or other digital content. In one embodiment, game client 248 may have been provided onto client device 200 in two or more portions. In one embodiment, a first portion of game client 248 might be initially provided onto client device 200 in a manner such that without the other portions, game client 248 may be unable to properly install and/or execute. For example, game client 248, in absence of the other portions, might be configured to merely provide a splash screen, menu page, setup screen, or the like, but unable to perform other actions. A limitation of the proper installation/execution of game client 248 is not constrained to this example, however, and other aspects, features, or the like, of game client 248 might be arranged to not properly function without the other components. However, at some later time, as described below, client device 200 may receive the remaining portions of game client 248, including secrets verification code 249, such that game client 248 might be installed and/or executable.

Secrets manager 246 represents a digital right management component configured and arranged to generate and/or store a plurality of secrets 280-282 onto client device 200. Secrets manager 246 may generate a plurality of different secrets 280-282 using a variety of mechanisms. Thus, for example, secret 280 might be generated as a .TXT file that might include a random value. In another non-exhaustive example, secret 281 might be generated as a .DAT file or the like, that includes generic data, such as a name of a game character, a name of a level within the computer application, or the like. Secrets 280-282 are not limited to these examples, and secrets manager 246 may generate any of a variety of other types of secrets. Thus, the invention is not to be construed as being narrowed by such examples. For example, a secret 282 might be configured as an .INI file that includes an operating system command, a program code instruction, a user name, a date, or any of a variety of other information. Moreover, secrets manager 246 is configured to generate a large number of secrets, typically between about 1000 and about 10,000. However, the invention is not limited to this range, and other ranges, values, or the like, may also be employed. One desirable aspect is to generate and store a sufficiently large number and different types of secrets as to make detection of them all difficult by a hacker.

In any event, secrets manager 246 is configured to further store secrets 280-282 in a variety of different locations, using a variety of different mechanisms. Thus, secrets may be stored within a registry component of operating system 241, within data storage 244, within another application or configured to appear as another application (e.g., an .EXE type file, or the like), on hard drive 272, or the like. Moreover, secrets may be stored using a variety of mechanisms, including employing a variety of different API calls, program instruction command, operating system instruction, or the like. For example, in a Windows environment, a file system call might be employed, or a Windows Management Instrumentation (WMI) call, or the like. Moreover, at least some of the secrets might be encrypted and stored. The invention is not limited to these non-exhaustive mechanisms and/or locations, and clearly others may also be used, without departing from the scope of the invention.

In one embodiment, secrets manager 246 may record information about the secrets 280-282, including, but not limited to their contents, their type, how they are stored, accessed, where they are stored, or the like. Secrets manger 246 may then encrypt such recorded information and provide the encrypted information over a network to a remote network device. In one embodiment, secrets manager 246 might be configured and arranged to then erase or otherwise delete itself from client device 200. In one embodiment, secrets manager 246 might remove other evidence from client device 200 that might be useable to determine its actions, including any information stored in cache about its actions, and/or other temporary files, or the like. Such removal of evidence may be performed in manner to further inhibit restoring it to the client device at some later time. In one embodiment, secrets manager 246 might be configured to further perform its actions within a secure sand-box such that its actions might also not be readily detectable. In one embodiment, therefore, secrets manager 246 might be configured and arranged not to be storable on hard drive 272, or other persistent storage. For example, secrets manager 246 may be configured to download and execute within temporary memory, such as RAM 232, or the like.

Secrets verification code 249 is configured and arranged to operate within various portions of game client 248 to search for and validate hidden secrets, such as secrets 280-282 on client device 200. As such, secrets verification code 249 might be provided to client device 200 as part of a subsequent downloading of game client 248. In one embodiment, secrets verification code 249 includes scripts, program instructions, and/or the like, along with secrets information data provided by secrets manager 246 over the network useable to search for and validate the hidden secrets. In one embodiment, secrets verification code 249 may be configured to be distributed into a plurality of sub code section across portions of game client 248. In this manner, secrets verification code 249 may not be quickly detected and/or branched around by a hacker. In one embodiment, secrets verification code 249 might set a value, change an instruction, or the like, within a portion of game client 248, such that if secrets verification code 249 is not executed, game client 248 is unable to properly install/execute. In any event, secrets verification code 249 might use the secrets information data to whether to selectively inhibit the continued installation/execution of game client 248 as described further below. Moreover, secrets verification code 249 may also be configured to collect information about piracy detection, and provide such information over a network to a remote network device. In one embodiment, secrets verification code 249 may provide a message to a user, a computer application owner, creator, distributor, merchant, or the like, indicating that a piracy attempt is detected.

In one embodiment, a user for which piracy is detected might be required to re-authenticate themselves to an authentication server, such as AS 110, or the like, of FIG. 1. In one embodiment, upon, and/or during authentication, another version of secrets manager 246 might be provided to client device 200 to generate and/or store new secrets, and to provide new information about the new secrets to a remote server. The new information may then be used to rebuild components of game client 248, including another secrets verification code 249 that may then be provided to client device 200 to replace current portions of game client 248. The new version of secrets verification code may then be useable to detect another piracy attempt.

Illustrative Network Device

Figure 3:
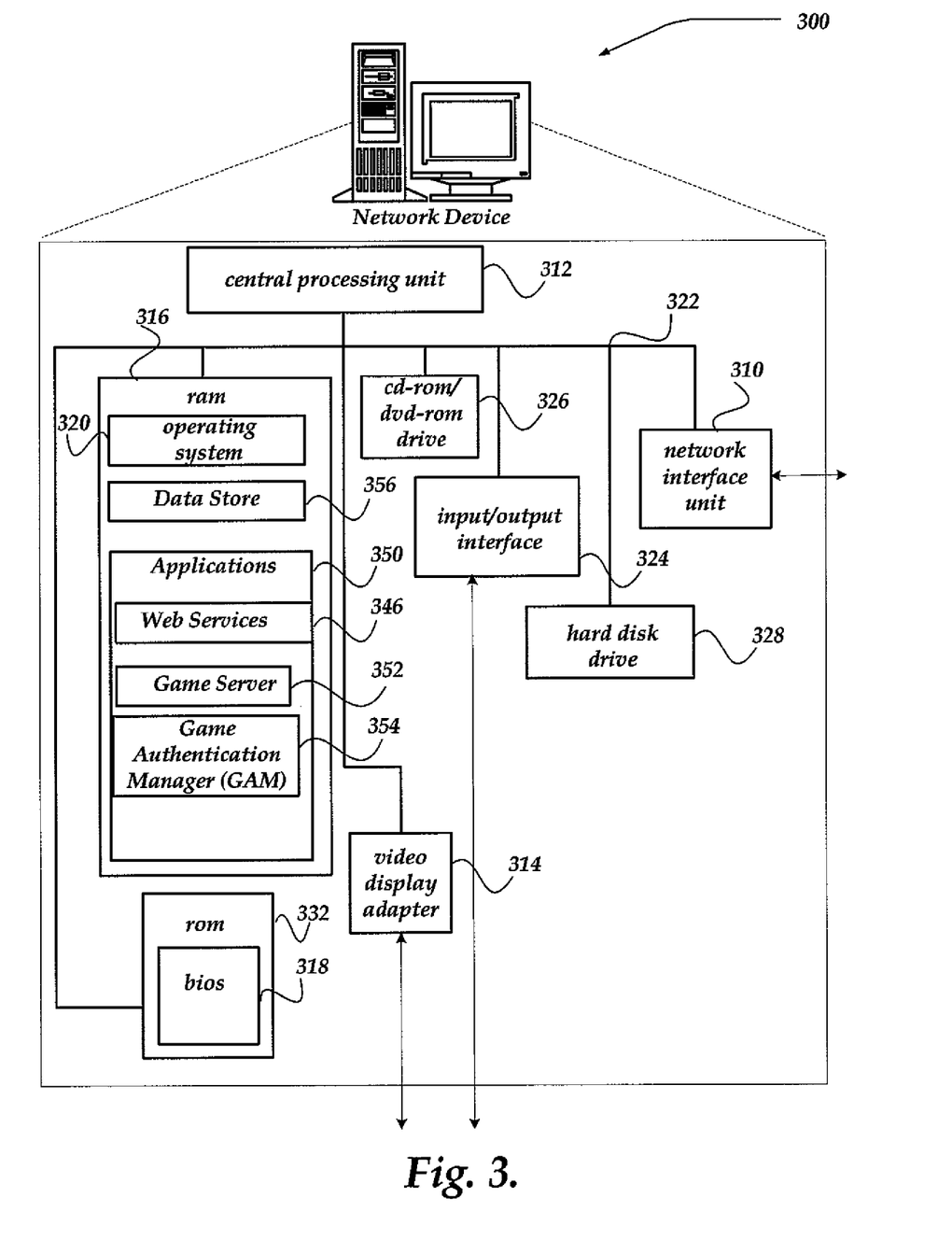
FIG. 3 shows one embodiment of a network device for use in managing distribution of an application configured to use hidden secrets for anti-piracy.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, AS 110 of FIG. 1, and/or even content server 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, and removable storage device 326 that may represent a tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol, Wi-Fi, Zigbee, WCDMA, HSDPA, Bluetooth, WEDGE, EDGE, UMTS, or the like. Network interface unit 310 is sometimes known as a transceiver, transceiving device, or network interface card (NIC).

The mass memory as described above illustrates another type of computer-readable media, namely computer storage media. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Applications 350 may also include web services 346, game server 352, and Game Authentication Manger (GAM) 354.

Web services 346 represent any of a variety of services that are configured to provide content over a network to another computing device. Thus, web services 346 include for example, a web server, messaging server, a File Transfer Protocol (FTP) server, a database server, a content server, or the like. Web services 346 may provide the content over the network using any of a variety of formats, including, but not limited to WAP, HDML, WML, SMGL, HTML, XML, cHTML, xHTML, or the like.

Data stores 360 includes virtually any component that is configured and arranged to store data including, but not limited to user preference data, log-in data, user authentication data, secrets information, and the like. Data store 360 also includes virtually any component that is configured and arranged to store and manage digital content, such as computer applications, video games, and the like. As such, data stores 360 may be implemented using a data base, a file, directory, or the like.

Game server 352 is configured to manage delivery of content, including components of the application, to a client device, such as clients 101-104 of FIG. 1. Typically game server 352 may provide components to an application, such as a game application to the client device over a network. At least one of the components provided is encrypted using any of a variety of encryption mechanisms. For example, in one embodiment of the invention, Crypto++, an open-source class library of cryptographic techniques, is employed in encrypting or decrypting components of the application. However, virtually any other encryption and decryption mechanism, including open source, commercial, and/or proprietary may be used, including Advanced Encryption Standard (AES), RSA Labs Inc.'s (hereinafter "RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL, WAKE, Sapphire II, BlumBlumShub, RSA, DSA, ElGamal, Nyberg-Rueppel (NR), BlumGoldwasser, Rabin, Rabin-Williams (RW), LUC, LUCELG, ECDSA, ECNR, ECIES, ECDHC, ECMQVC, and the like.

Game server 352 may further receive and/or authenticate are request from a client device for access to an application. Gamer server 352 may partition a requested application into a plurality of components. In one embodiment, such partitioning may be performed differently for each request for the application. In another embodiment, the partitioning might be performed before a request is received.

Gamer server 352 may operate in conjunction with (GAM) 354 to authenticate the request, or receive information from the client device indicating that the request is currently authenticated. In any event, gamer server 352 and/or GAM 354 might provide to the authenticated client device a subset of the components of the requested application. In addition, game server 352 and/or GAM 354 might provide a secrets manager component securely to the client device. Game server 352 and/or GAM 354 may then receive information about secrets stored on the client device. Game server 352 and/or GAM 354 may then employ the received secrets information to modify portions of the application that might not have been provided to the client device. Furthermore, game server 352 and/or GAM 354 may include secrets verification code within the removed portions of the application. In one embodiment, game server 352 and/or GAM 354 might further select which secrets are armed or unarmed for a given client device. Such selection may be determined based on a variety of factors, including, but not limited to a number of secrets having been generated for the client device, the different types of secrets generated, a history of piracy detection for a given client device, based on a random selection, engineering judgment, statistical analysis of secrets detections over time, or the like.

In one embodiment, however, the secrets verification code might already be included in the removed portions of the application. As such, the secrets verification code might operate based on changes incorporated in the secrets information, and/or other related data that may be included into the removed portions of the application. Thus, in one embodiment, an overall structure of the application might remain fairly consistent, but is configured to operate differently based on the secrets information that is provided to the application.

In any event, the missing portions of the application, along with the secrets verification code may then be provided to the client device for installation. In one embodiment the missing portions might be provided over a network using a mechanism substantially similar to what might be employed for updating versions of an application, providing patches to an application, or the like. In this manner, a user might be less suspect of the received portions.

In any event, GAM 354 might receive information from a client device indicating whether a piracy attempt is detected. GAM 354 may then perform one or more anti-piracy actions, including, but not limited to sending a message to a user, removing the user's account, revoking an authentication credential, or the like.

It is noted that while game server 352 and GAM 354 are illustrated as distinct components, the invention is not so limited. For example, in one embodiment, game server 352 and GAM 354 might be integrated. Moreover, in still another embodiment, game server 352 and GAM 354 might operate on different network devices.

Generalized Operation

Figure 4:
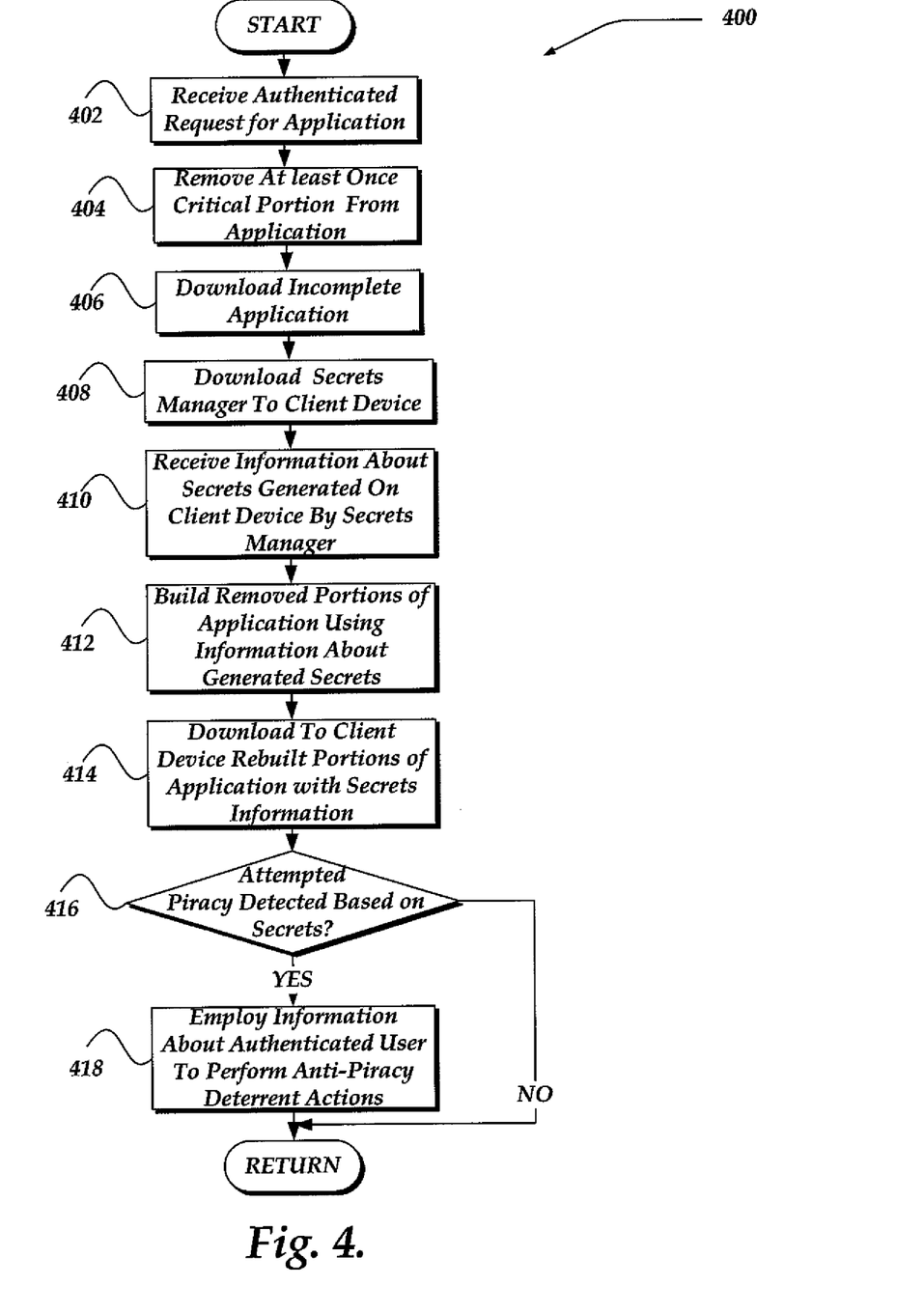
FIG. 4 illustrates a flow chart for one embodiment of a process of managing distribution of an application configured to use hidden secrets for anti-piracy.

The operation of certain aspects of the invention will now be described with respect to FIGS. 4-5. FIG. 4 illustrates a flow chart for one embodiment of a process of managing distribution of an application configured to use hidden secrets for anti-piracy.

Figure 5:
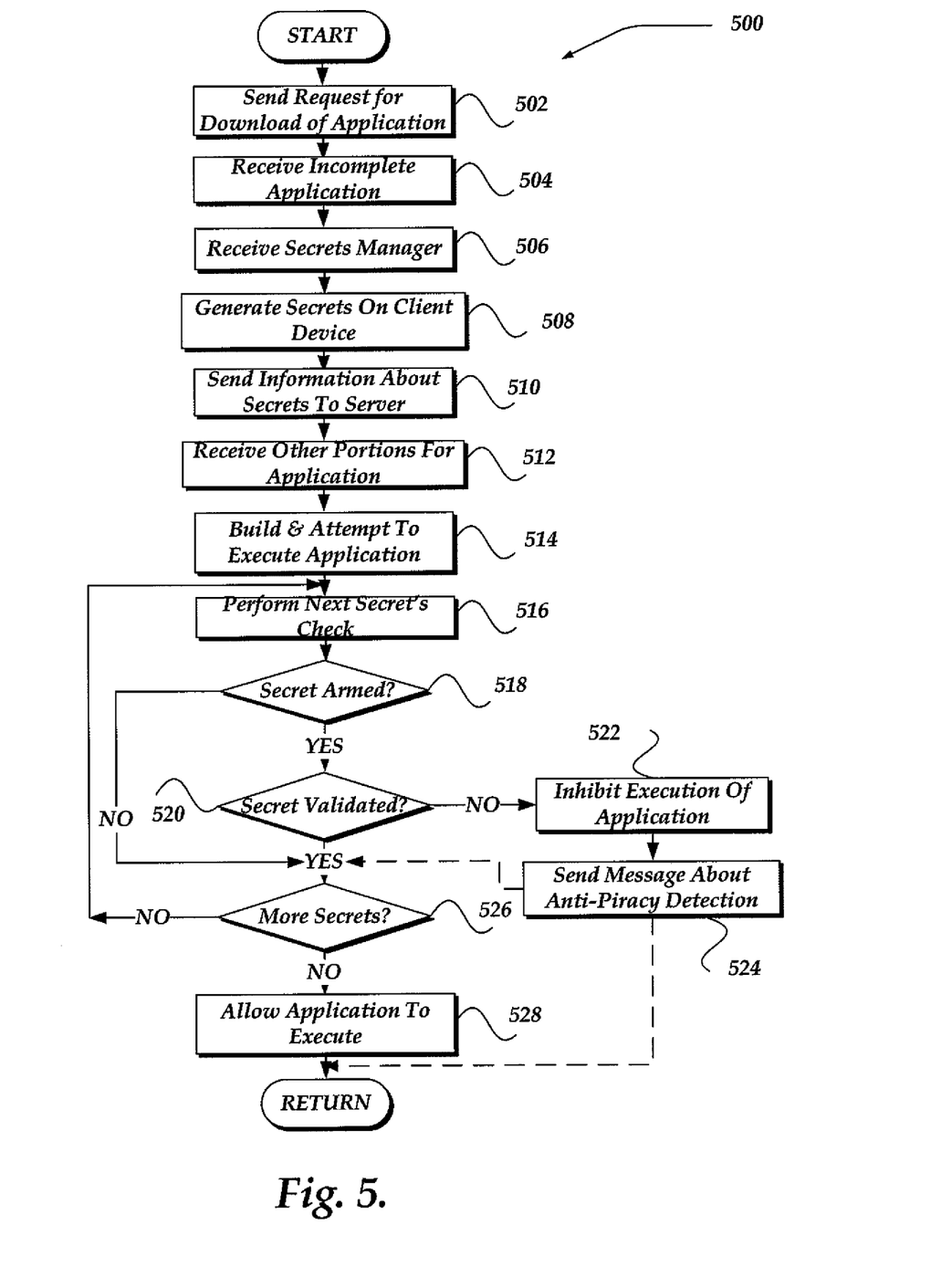
FIG. 5 illustrates a flow chart for one embodiment of a process of managing anti-piracy detection at a client device using hidden secrets.

Process 400 of FIG. 5 may be implemented within authentication server (AS) 110 of FIG. 1. However, the invention is not so limited. In another embodiment, content server 106 of FIG. 1 may also be configured to perform at least a portion of process 400. In still another embodiment, portions of process 400 might be distributed across content server 106 and AS 110 of FIG. 1, without departing from the scope of the invention.

In any event, process 400 begins, after a start block, at block 402, where a request for downloading of an application is received. In one embodiment, the request may already be authenticated. For example, in one embodiment, the request might have been authenticated through receive and examination of a user's digital credentials, including, but not limited to a user name/password, a digital certificate, a digital token, or the like. In another embodiment, authentication may be performed as part of block 402. Such authentication might be performed to determine whether the requester is authorized to receive the application.

Processing continues to block 404, where various portions of the requested application may be removed from a plurality of portions that comprise the application. In one embodiment, the removed portions may comprise code and/or data where, at least some of the removed portions may necessary to enable the application to properly install and/or execute. Processing continues to block 406, where the incomplete portions of the application may then be downloaded to the user's client device. In one embodiment, the incomplete application might be encrypted and sent over a network. However, in another embodiment, the incomplete application might not be encrypted.

In any event, process 400 flows next to block 408, where a secrets manager is downloaded to the client device. In one embodiment, the secrets manager may be downloaded with the incomplete application. In another embodiment, the secrets manager may be downloaded before, or after the incomplete application. In any event, the downloaded secrets manager is configured and arranged to generate a plurality of secrets that are stored in a plurality of different locations on the client device.

In one embodiment, the secrets manager may generate the secrets and store them onto the client device using any of a variety of different operating system commands, application programming interfaces (APIs), or the like. In one embodiment, the secrets manager is configured to employ a plurality of different APIs, and the like, such that the variety of different mechanisms used to store the secrets may further obfuscate the storage of the secrets. However, the secrets need not be hidden. That is, the secrets may be stored "in the open" as a standard looking file, document, or the like. Such 'in the open' storing is also intended to render locating the secrets more difficult. For example, a secret might be stored as a standard looking .TXT file, .XLS file, .INI file, or the like. For example, the secret might be 'distinguished' as a cookie type file that is readily locatable. However, the invention might also store the secrets in a variety of different directories, registries, on different devices, or the like. By using a variety of different storage techniques, locations, file names, extensions, and the like, a hacker may find it more difficult to distinguish a secret from a normal file. Moreover, by using a variety of different commands, APIs, and the like, to store the secret, it is intended that a hacker may be further confused as to whether the command, API, or the like, is a normal application instruction, or the like, or one that is directed to storing of a secret.

In addition, secrets need not employ hardware specific identifications, or other client device specific characteristics in the creation of the secret. Thus, for example, a secret need not include a product serial number for an operating system, hardware component, or the like. Rather, in one embodiment, by storing a 'large' quantity of different secrets, a client device may be made to be unique. While no specific number of secrets is required, it is desirable to generate and store a large number of secrets. That is, the number of secrets might be between about 100 to about 10,000 secrets, or so. It is pointed out, however, that the invention is not limited to this range, and other ranges of secrets stored may also be used. Thus, in another embodiment, 20K might be a more reasonable number. It is desirable to be able to perform a search and analysis of the secrets relatively early in a sequence of steps to install and/or execute the requested application. If the number of secrets to be analyzed is too many for a given client device such that the client device might take an extraordinary time, a user might become dissatisfied. Thus, engineering judgment, an understanding of different client devices, processor speeds, storage locations used, and the like, might result in a different number of secrets for different client devices, categories of client devices, or the like. It may be reasonable to state, however, that one to ten secrets might be too few, for a variety of reasons, in some circumstances. For example, too few secrets may result in a hacker quickly locating the secrets. Moreover, too few secrets might have a drawback where, the secrets might be inadvertently destroyed by a user while performing a clean up on their client device, or the like. Thus, it should be recognized that the invention is not limited to any particular number or ranges of numbers of secrets, and/or how the secrets may be stored.

As the secrets manager generates and/or stores the secrets, the secrets manager records information about the secrets, including, but not limited to the secret and where the secret is hidden. The recorded information may then be encrypted using any of a variety of encryption mechanisms, including but not limited to symmetric keys, asymmetric keys, or the like, including, but not limited to DES, AES, or the like. In any event, processing flows to block 410, where the encrypted secrets information is transmitted over the network and received at the server.

Continuing to block 412, the removed portions of the application may then be rebuilt to include the received secrets information as well as secrets verification code. In one embodiment, the secrets information and/or the secrets verification code may be distributed across various sub locations within the removed portions of the application. In one embodiment, at least some of the hidden secrets may be designated as armed or unarmed, either as they are generated, and/or as they are included within the removed components of the application. Armed secrets are those secrets designated to result in inhibiting of the installation and/or execution of the application should the secrets verification code be unable to locate the armed secret, and/or otherwise detects that the armed secret is modified. Unarmed secrets might be examined, or searched for, but do not result in inhibiting access to the application based on the results of the search/examination. Such designation might be included in the received secrets information, and/or be defined on the fly as the removed portions are rebuilt.

In one embodiment, the armed/unarmed information might be generated dynamically at a time of searching for and evaluating the hidden secrets. In another embodiment, the armed/unarmed information might be generated not at the client device, but rather at the remote server. In this manner, such information might be made more difficult to access by a hacker.

As noted above, the armed/unarmed information might be determined dynamically. For example, in one embodiment, the determination might be based on a characteristic of the client device, including, but not limited to a hardware characteristic, software characteristic, a time of day, or the like. As an example, consider that a ratio of armed to unarmed secrets is set for a given client device, such as 1:10. Clearly, such ratio, is not the only possible ratio, and others ratios may also be selected. Thus, the invention is not to be construed as being limited by this non-exhaustive example. In any event, a determination of whether a secret is armed or not might be made based on whether the value of the secret is divisible by 10. For example, if the secret includes a value based on a current IP address of the client device, a random value, or the like, then such a value might be tested to see if it is evenly divisible by 10, and if so, with no remainder, then the secret might be determined to be unarmed; otherwise, the secret might be determined to be armed. As such, because different clients have different IP addresses, different hash values created, and the like, a determination of whether or not a given secret is armed or not may be made more complicated. Moreover, the mechanism used to determine whether the secret is armed may be different for each client device. Thus, one client device might use a division by 12, while another uses a modulo calculation, or looks to a particular digit in a particular location of the secret to see if it is above or below some defined value. Then based on such determination, the secret may be determined to be armed or unarmed. If a hacker attempted to remove 'armed' secrets based on one client device, such secrets might not be 'armed' on another client device. While these 'arming' determinations represent a couple of different approaches, they are not exhaustive. As such, the invention is not to be limited by such non-exhaustive examples.

The revised removed portions of the application are then downloaded to the client device at block 414, where the client device is enabled to build the application. At some point in time, the user may attempt to install and/or execute the application, in which case the secrets verification code is executed. Execution of the secrets verification code is directed towards searching for each of the hidden secrets, and then based on whether the secret is armed or unarmed, and/or a result of the search and examination of the hidden secret, selectively inhibiting installation and/or execution of the application.

In one embodiment, if the secrets verification code detects an unauthorized attempt of piracy of the application based on the search and/or examination of the hidden secrets, a message may be received by the server indicating that an attempted piracy is detected. Thus, processing flows to decision block 416, where a determination is made whether a message indicating an attempt at piracy is received. If so, processing proceeds to block 418; otherwise, processing may return to a calling process to perform other actions.

At block 418, any of a variety of anti-piracy actions may be performed. In one embodiment, information about the client device for which piracy is detected might be received with the message. Such information might include, but is not limited to a user identifier, a network address of the client device, a geophysical location of the client device, an identifier of the application, a number of secrets that failed, or the like. Such information might then be used to determine an anti-piracy response.

For example, in one embodiment, it might be determined that the same client device, based on the network address, or the like, is repeatedly failing the secrets verification code. This might be due, for example, the user continually cleaning the client device and thereby inadvertently destroying some of the armed secrets. In one embodiment, as a result, the number of armed secrets tested for this client device might be modified, or the like. For example, a larger number of failed verification tests might be used before this client device is inhibited from accessing the application. However, other responses might also be employed. For example, it might be determined that this client device is associated with other types of piracy and/or hacking activities. As such, a notice might be provided to the client device indicating that such actions might result in withdrawal of rights to access the computer application, or the like. It should be clear that a variety of actions might be performed at block 418 to deter detected piracy, minimize 'false' detections, or the like. In any event, processing then returns to a calling process to perform other actions.

FIG. 5 illustrates a flow chart for one embodiment of a process of managing anti-piracy detection at a client device using hidden secrets. Thus, in one embodiment, while process 400 of FIG. 4 might be viewed as actions performed on a remote network device, process 500 of FIG. 5 may be viewed as representing a possible process performable on a client device.

Process 500 begins, after a start block, at block 502, where a request is sent for downloading or otherwise accessing a computer application, such as a game, or the like, onto a client device. In one embodiment, the request may be sent to a content server, authentication server, or the like, such as illustrated in FIG. 1.

Processing continues to block 504, where an incomplete application is received at the client device. As described above, in one embodiment, portions of the received application may have been removed in a manner such that the received application might not install, and/or execute as expected. For example, in one embodiment, the application might be configured to not execute beyond a defined location within the application program flow. For example, in one embodiment, merely an application splash screen, a home screen, or the like, might be displayed, without further ability to employ the application.

Continuing to block 506, a secrets manager may also be received. In one embodiment, the secrets manager may be received with the incomplete application. However, in other embodiments, the secrets manager might be received before or after receiving the incomplete application. The invention is not constrained to a particular timing of when the secrets manager is received. However, in one embodiment, the secrets manager might be provided to the client device in a manner that is directed towards protecting it from external inspections. For example, in one embodiment, the secrets manager might be received in an encrypted form.

Process 500 flows next to block 508, where the secrets manager may install and execute. In one embodiment, the installation and/or execution is performed automatically without additional user interactions. In one embodiment, the secrets manager may be decrypted, installed, and/or executed using a variety of actions that might not employ, for example, standard operating system functions. This is done to avoid leaving exploitable traces on the client device. Thus, in one embodiment, a script, applet, or portion of the secrets manager might be generated that performs the decryption, installation, and/or executed in a sand-box type of configuration that is directed towards hiding its actions.

At block 508, the executing secrets manager may generate a plurality of different secrets, and store them in a plurality of different locations on the client device. In embodiment, the secrets might be stored on the client device using common operating system application programming interfaces (APIs), or the like. In one embodiment, as large number of different mechanisms might be used to store the secrets to further obfuscate the secret generation and/or storage actions. As noted elsewhere, a secret need not include information about a client device, such as software identifier, operating system characteristics, hardware characteristics, or the like. By avoiding use of such client device specific characteristics to generate a secret, a user might be able to change a configuration of the client device with minimal impact to a secret.

In order for a secrets protected application to be 'stolen,' the invention attempts to force a hacker to have to reproduce virtually all of the secrets on a different client device or remove all the secret checks within an application that could cause the application to terminate. Thus, as noted above, a large number of different secrets are generated for a given client device. Moreover, by generating and storing a large number of different secrets, it is possible that no two client devices will include a same set and type of secrets. Moreover, while the secrets verification code that is later included in the missing components of the application (at block 514) may be configured to search for and/or examine each stored secret, not all of the secrets are armed such that a failure on the armed secret could result in an inability to install/execute the application.

Process 500 continues to block 510 where information about the secrets, where they are stored, and the like, is then encrypted and sent to the remote network device over the network. The information is then employed to build the missing components from the application, as described above in more detail in conjunction with FIG. 4. In one embodiment, to further make attacks more difficult, the secrets manager might be configured to securely erase itself and/or other evidence of its presence from the client device.

Flowing next to block 512, the built missing components are then received over the network at the client device, where, at block 514, the components are then employed to build and attempt to install/execute the application.

At block 516, a secrets verification code within the built application is then executed. As noted above, the secrets verification code may be 'scattered' across a variety of different locations within the application to further obfuscate the actions. For example, it is desirable to avoid placing all of the secrets verification code within a first few lines of code executed by the application. This avoids such possible approaches as hacking the application to 'branch' around the secrets verification code. Moreover, the secrets verification code may be further disguised as common API calls, file opens, file reads, or the like, such that the code is difficult to determine whether it is testing for secrets, or performing other activities related to the application.

At block 516, in one embodiment, every secret for the client device might be sought and examined. Thus, as a secret verification is encountered in the secrets verification code, processing flows to decision block 518, where a determination is made whether the secret being examined is armed or not. If it is armed, processing flows to decision block 520; otherwise, processing might branch to decision block 526.

At decision block 520, a determination is made whether the armed secret being evaluated is found and validated. Because information about the secrets is hidden within components of the application, a comparison of the contents of the secret found may be performed to confirm that its content matches the information within the application. If it the secret is not found, and/or is not valid, processing flows to block 522; otherwise, processing flows to decision block 526.

At block 522, in one embodiment, the installation and/or execution of the application may be inhibited. That is the secrets verification code might force the application to exit, or the like. In one embodiment, the secrets verification code might be configured to allow for a defined number of failed secrets before the application is inhibited. Thus, processing flows to block 524, where a message about the status of the verification might be sent over a network. In one embodiment, where the client device is detected to be disconnected from a network, sending of a message might be delayed until a network connection is detected. Processing may then, selectively flows to decision block 526, if a defined number of failed secrets are to be tested, or optionally return to a calling process to perform other actions.

At decision block 526, if more secrets are to be examined, processing loops back to block 516; otherwise, processing flows to block 528, where the application may be allowed to install and execute. Process 500 then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. An apparatus useable in managing access to digital content, comprising:
   a network interface component for receiving and sending information over a network;
   a processor, in communication with the network interface component that includes machine instructions that cause the processor to install an application onto the apparatus, the application being configured to perform operations, including:
     sending a first portion of an application to a client device, wherein the application is unable to execute fully absent a second portion of the application;
     sending a secrets manager to the client device, wherein the secrets manager is configured to generate and to store a plurality of different secrets on the client device separate from the secrets manager and the application, at least one of the secrets being stored as a visible text file, and wherein the secrets manager is distributed separately from the application;
     receiving from the secrets manager information about the plurality of stored secrets;
     employing the information about the plurality of stored secrets and secrets verification code to modify the second portion of the application;
     sending the second portion of the application to the client device wherein the secrets verification code is configured to search for and examine the plurality of different secrets and employ a result of the search and examination to detect an attempt to pirate the application, and if an attempt to pirate is detected, to further inhibit execution of the application.

2. The apparatus of claim 1, wherein examining the plurality of secrets further comprises:
   determining if a secret in the plurality of secrets is armed, and if the secret is armed, determining if the secret is found and matches data within the information about the plurality of secrets; and
   if an other secret in the plurality of secrets is unarmed, ignoring if the other secret matches other data within the information about the plurality of secrets.

3. The apparatus of claim 1, wherein at least one secret in the plurality of secrets comprises at least one of a name of a game character, a code instruction, or a random value.

4. The apparatus of claim 1, wherein at least one of the plurality of secrets is stored using an Application Programming Interface (API) call.

5. The apparatus of claim 1, wherein the secrets manager is further configured to perform actions securely and to further delete itself from the client device after sending of the information about the plurality of secrets.

6. The apparatus of claim 1, wherein at least one other of the secrets is stored as an initialization file, a data file, or a file named with an executable file extension.

7. The apparatus of claim 1, wherein each secret in the plurality of secrets is generated independent of a hardware characteristic of the client device within the respective secret.

8. The apparatus of claim 1, wherein at least one of the stored secrets is destructible without inhibiting execution of the application.

9. A method of managing access to a computer application, comprising:
   executing a secrets manager component that is configured to generate and store on a client device a plurality of different types of secrets in other than the computer application, wherein at least one of the stored secrets is unarmed and at least one other stored secret is armed, and wherein the secrets manager component is distributed separately from the computer application;
   revising a portion of the computer application to include information about each of the plurality of stored secrets;
   executing at least the portion of the computer application to search for each of the plurality of stored secrets;
   if a stored secret is armed and is either unfound and detected to be modified, then inhibiting execution of at least an other portion of the computer application; and
   if an other stored secret is unarmed, ignoring whether the other secret is found or modified.

10. The method of claim 9, wherein the steps of method 9 are implemented within as computer-executable instructions stored on a computer-readable storage medium.

11. The method of claim 9, wherein the secrets manager is configured to be automatically be deleted from the client device upon sending information about the stored plurality of different types of secrets to an other computer device.

12. The method of claim 9, wherein at least one type of stored secret includes a random value and at least one other type of stored secret includes a character string representing an item operated upon within the other portion of the computer application.

13. The method of claim 9, wherein storing the plurality of different types of secrets further comprising storing the secrets as one at least one of a text file, a computer application data file, or a computer application initialization data file.

14. The method of claim 9, wherein revising a portion of the computer application further comprises including a secrets verification code and information about each of the plurality of stored secrets, such that the secrets verification code employs the information to perform a comparison with a found armed secret to determine if the found armed secret is modified.

15. A client device that is configured for use in managing access to a video game, comprising:

a processor; and memory in communication with the processor useable in storing data and machine instructions that causes the processor to perform actions, including:

receiving a first portion of a computer application, wherein the computer application is configured to be inoperable without a second portion of the computer application;

executing a secrets manager component that is configured to generate and store on the client device a plurality of different types of secrets in locations other than the computer application, wherein the types differ by more than their contents, and wherein the secrets manager component is distributed separately from the computer application;

securely sending information about the stored plurality of different types of secrets to a network device;

receiving the second portion of the computer application, wherein the second portion includes a secrets verification component and the information about the stored secrets, and wherein at least one secret is defined to be armed, while at least one other secret is defined to be unarmed;

executing the secrets verification component to search for each of the plurality of stored secrets; and if a defined number of armed secrets are determined to be modified, inhibiting execution of the computer application including the second portion.

16. The client device of claim 15, wherein if a secret is determined to be unarmed, ignoring a status of the unarmed secret.

17. The client device of claim 15, wherein the processor performs further actions, including:

if the execution of the computer application is inhibited based on a detection of a modified secret, sending to the network device, additional information useable to perform at least one of a rejection of a digital right to access the computer application from the network device, sending a message to a user of the client device indicating that potential piracy is detected, or modifying the second portion of the computer application with a revised defined number and providing the modified second portion to the client device.

18. A system that is configured for use in managing access to digital content over a network, comprising:

memory device having a secrets manager component that is configured and arranged to perform actions, comprising:

securely storing a plurality of different types of secrets on a client device, wherein the secrets are independent of a hardware configuration of the client device and in locations other than a game application, and wherein the secrets manager component is distributed separately from the game application; and securely providing over the network information about the stored secrets, including at least a content of each secret and a stored location of each secret; and a server device that is configured and arranged to perform actions, including:

receiving the information about the stored secrets over the network;

modifying at least a portion of the game application with the received information, and further identifying at least one secret to be armed and at least one other secret to be unarmed;

providing the modified portion of the game application to the client device, wherein the modified portion is configured to perform actions, including:

determining if a defined number of armed secrets is modified, and if the defined number of armed secrets is determined to be modified, inhibiting execution of the game application on the client device.

19. The system of claim 18, wherein the modified portion is configured to perform actions, including: for each secret determined to be defined as unarmed, skipping evaluating if the secret is modified.

20. The system of claim 18, wherein the secrets manager component is configured to be securely sent over the network to the client device to execute within the client device absent an indication to a user that the secrets manager is executing, and upon sending of the secrets information, to automatically be deleted absent user intervention.

* * * * *

UNITED STATES PATENT AND TRADEMARK OFFICE
CERTIFICATE OF CORRECTION

PATENT NO.         : 8,578,510 B2                                     Page 1 of 1
APPLICATION NO.    : 12/147459
DATED              : November 5, 2013
INVENTOR(S)        : John Cook et al.

It is certified that error appears in the above-identified patent and that said Letters Patent is hereby corrected as shown below:

In the Specification

In Column 4, Line 26, delete "WMLSeript," and insert -- WMLScript, --, therefor.

In Column 6, Line 9, delete "Mobil" and insert -- Mobile --, therefor.

In Column 6, Line 9, delete "(OSM)," and insert -- (GSM), --, therefor.

In Column 6, Line 27, delete "ODS" and insert -- GDS --, therefor.

In Column 8, Line 26, delete "Her" and insert -- further --, therefor.

Signed and Sealed this
Twentieth Day of May, 2014

Michelle K. Lee
*Deputy Director of the United States Patent and Trademark Office*